United States Patent
Lane et al.

(10) Patent No.: US 7,745,022 B2
(45) Date of Patent: Jun. 29, 2010

(54) CMC WITH MULTIPLE MATRIX PHASES SEPARATED BY DIFFUSION BARRIER

(75) Inventors: Jay E. Lane, Mims, FL (US); Jay A. Morrison, Oviedo, FL (US); Steven C. Butner, San Marcos, CA (US); Andrew Szweda, San Diego, CA (US)

(73) Assignee: Siemens Energy, Inc., Orlando, FL (US)

( * ) Notice: Subject to any disclaimer, the term of this patent is extended or adjusted under 35 U.S.C. 154(b) by 945 days.

(21) Appl. No.: 11/489,855

(22) Filed: Jul. 20, 2006

(65) Prior Publication Data

US 2010/0119807 A1 May 13, 2010

Related U.S. Application Data

(60) Provisional application No. 60/702,010, filed on Jul. 22, 2005.

(51) Int. Cl.
    *B32B 9/00* (2006.01)
(52) U.S. Cl. .................. 428/701; 428/689; 428/697; 428/698; 428/699; 428/704
(58) Field of Classification Search .............. 428/689, 428/697, 698, 699, 701, 702, 704
    See application file for complete search history.

(56) References Cited

U.S. PATENT DOCUMENTS

| | | | |
|---|---|---|---|
| 4,158,687 A | 6/1979 | Yajima et al. | |
| 4,652,413 A | 3/1987 | Tiegs | |
| 5,202,059 A | * 4/1993 | Kennedy | 252/389.31 |
| 5,514,474 A | 5/1996 | Morgan et al. | |
| 5,665,463 A | 9/1997 | Morgan et al. | |
| 5,856,252 A | 1/1999 | Lange et al. | |
| 6,218,324 B1 | 4/2001 | Goettler | |
| 6,309,994 B1 | 10/2001 | Marra et al. | |
| 6,528,190 B1 | 3/2003 | Campbell et al. | |
| 6,716,407 B2 | 4/2004 | Davis et al. | |
| 6,863,999 B1 | 3/2005 | Sudre, et al | |

(Continued)

FOREIGN PATENT DOCUMENTS

EP    1 013 412 A1    6/2000

(Continued)

OTHER PUBLICATIONS

Kristin A. Keller, Tai-Il Mah, Triplicane A. Parthasarathy, Emmanuel E. Boakye, Pavel Mogilevsky and Michael K. Cinibulk; "Effectiveness of Monazite Coatings in Oxide/Oxide Composites after Long-Term Exposure at High Temperature"; Journal of American Ceramic Society; Feb. 2003; pp. 325-331; XP-002405087.

(Continued)

*Primary Examiner*—Gwendolyn Blackwell

(57) ABSTRACT

A ceramic matrix composite (CMC) material (10) with increased interlaminar strength is obtained without a corresponding debit in other mechanical properties. This is achieved by infusing a diffusion barrier layer (20) into an existing porous matrix CMC to coat the exposed first matrix phase (19) and fibers (12), and then densifying the matrix with repeated infiltration cycles of a second matrix phase (22). The diffusion barrier prevents undesirable sintering between the matrix phases and between the second matrix phase and the fibers during subsequent final firing and use of the resulting component (30) in a high temperature environment.

13 Claims, 3 Drawing Sheets

U.S. PATENT DOCUMENTS

| | | |
|---|---|---|
| 2002/0189496 A1 | 12/2002 | Davis et al. |
| 2002/1097465 | 12/2002 | Butner et al. |
| 2005/0218565 A1 | 10/2005 | DiChiara, Jr. |

OTHER PUBLICATIONS

J.B. Davis, D.B. Marshall, P.E.D. Morgan; "Monazite-containing oxide/oxide composites"; Journal of the European Ceramic Society 2000; Aug. 13, 1999; pp. 583-587; Elsevier Science Ltd.

Fujita, Hiroki, et al. Mullite/Alumina Mixtures for Use as Porous Matrices in Oxide Fiber Composites. American Ceramic Society, Journal, v. 87 (2), 2004, pp. 261-267.

Mattoni, Michael A., et al Effects of Matrix Porosity on the Mechanical Properties of a Porous-Matrix, All-Oxide Ceramic Composite. American Ceramic Society, Journal, v. 84 (1), 2001, pp. 2594-2602.

* cited by examiner

CMC WITH MULTIPLE MATRIX PHASES SEPARATED BY DIFFUSION BARRIER

This application claims benefit of the 22 Jul. 2005 filing date of U.S. provisional patent application No. 60/702,010.

FIELD OF THE INVENTION

This invention relates generally to the field of materials technology, and more particularly to ceramic matrix composite materials.

BACKGROUND OF THE INVENTION

The current generation two-dimensional laminate porous oxide ceramic matrix composites (CMC) have relatively low interlaminar strength properties. Three-dimensional CMC materials have higher interlaminar strength; however 3D materials are more expensive and have not yet been fully developed for commercial applications, such as for use in the hot gas path of a gas turbine engine. It is known to improve the interlaminar strength of 2D CMC materials by further densifying the porous matrix in a conventional manner with additional sinterable phase matrix material. Unfortunately, as porosity is decreased in such materials, there is a corresponding reduction in in-plane strength (reduced by more than half in some embodiments) and the material becomes brittle as the interconnection between the matrix and the fibers becomes stronger.

It is known in both oxide and non-oxide CMC materials to apply an interface coating material to the fiber prior to matrix formation in order to decrease the fiber-matrix interconnection. The interface material functions to deflect cracks forming in the matrix material away from the fibers, thereby preserving the fiber network strength and the resulting in-plane mechanical properties. Unfortunately, fiber tows that are coated with interface coating materials are more difficult and expensive to weave and the coatings tend to spall off of the fibers during weaving. Furthermore, no viable process has yet been demonstrated for solution coating of filaments in fiber form, since close-packed fibers in cross-over points are difficult to coat.

BRIEF DESCRIPTION OF THE DRAWINGS

The invention is explained in the following description in view of the drawings that show.

DETAILED DESCRIPTION OF THE INVENTION

The present inventors have developed innovative processes and resulting novel ceramic matrix composite materials that exhibit improved interlaminar strength without the usual corresponding degree of reduction of other mechanical properties. These improvements are achieved with a matrix material that includes at least two phases separated by a diffusion barrier. The diffusion barrier is effective to limit sintering between the two phases and optionally between one of the matrix phases and the encased ceramic fibers. In one exemplary embodiment, a known oxide/oxide CMC material sold under the brand name A/N720-1 by COI Ceramic, Inc. of San Diego, California is further densified in a bisque fired state with a second matrix phase infused by conventional matrix densification steps only after the porous matrix has been infused with a monazite diffusion barrier material effective to coat exposed surfaces of the bisque fired matrix and embedded fibers. A/N720-1 material utilizes Nextel® N720 fibers (85% alumina and 15% silica in the form of mullite and alumina polycrystals) disposed in an alumina matrix, and the second matrix phase was also selected to be alumina. The monazite diffusion barrier material used in the exemplary embodiment was a lanthanum phosphate ($LaPO_4$). The resulting densified CMC material exhibited fully-fired short beam shear (SBS) in-plane shear strength that was increased by 21% over the known A/N720-1 material not having the densified matrix, and flatwize tensile strength (FWT) interlaminar strength that was increased by 64% over the known material. These improvements were achieved with a corresponding decrease of only 16% in the in-plane tensile strength when compared to the known material. Similar, although less dramatic, improvements have been obtained in test samples of other oxide/oxide CMC materials.

Figure 1:
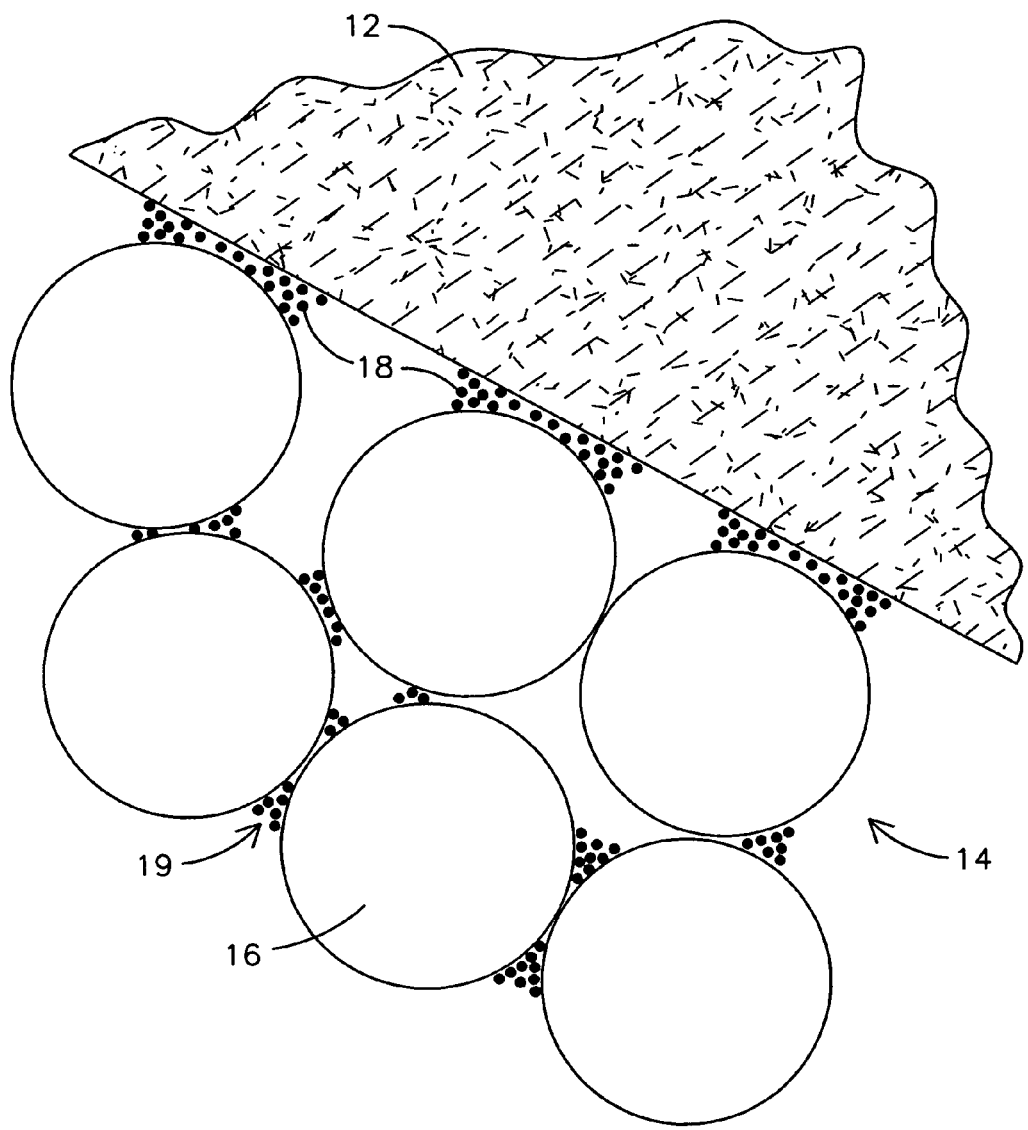
FIG. 1 is a schematic illustration of an improved ceramic matrix composite material at a stage of manufacturing wherein ceramic fibers are surrounded by a first phase of a ceramic matrix material. At this stage of manufacture the material is known in the Prior Art.
Figure 2:
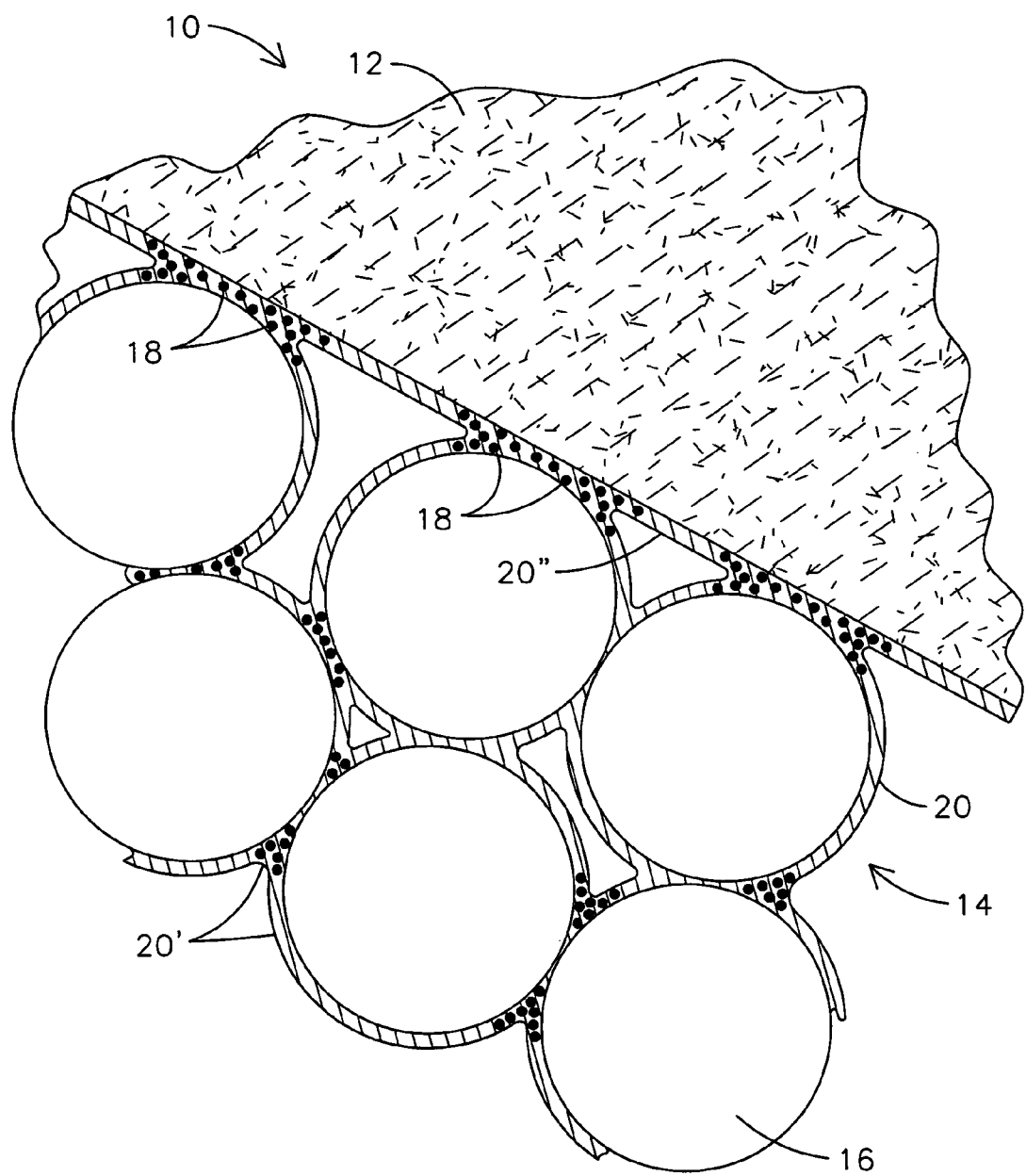
FIG. 2 is the material of FIG. 1 after further processing to apply a diffusion barrier layer over the first matrix phase and fibers.
Figure 3:
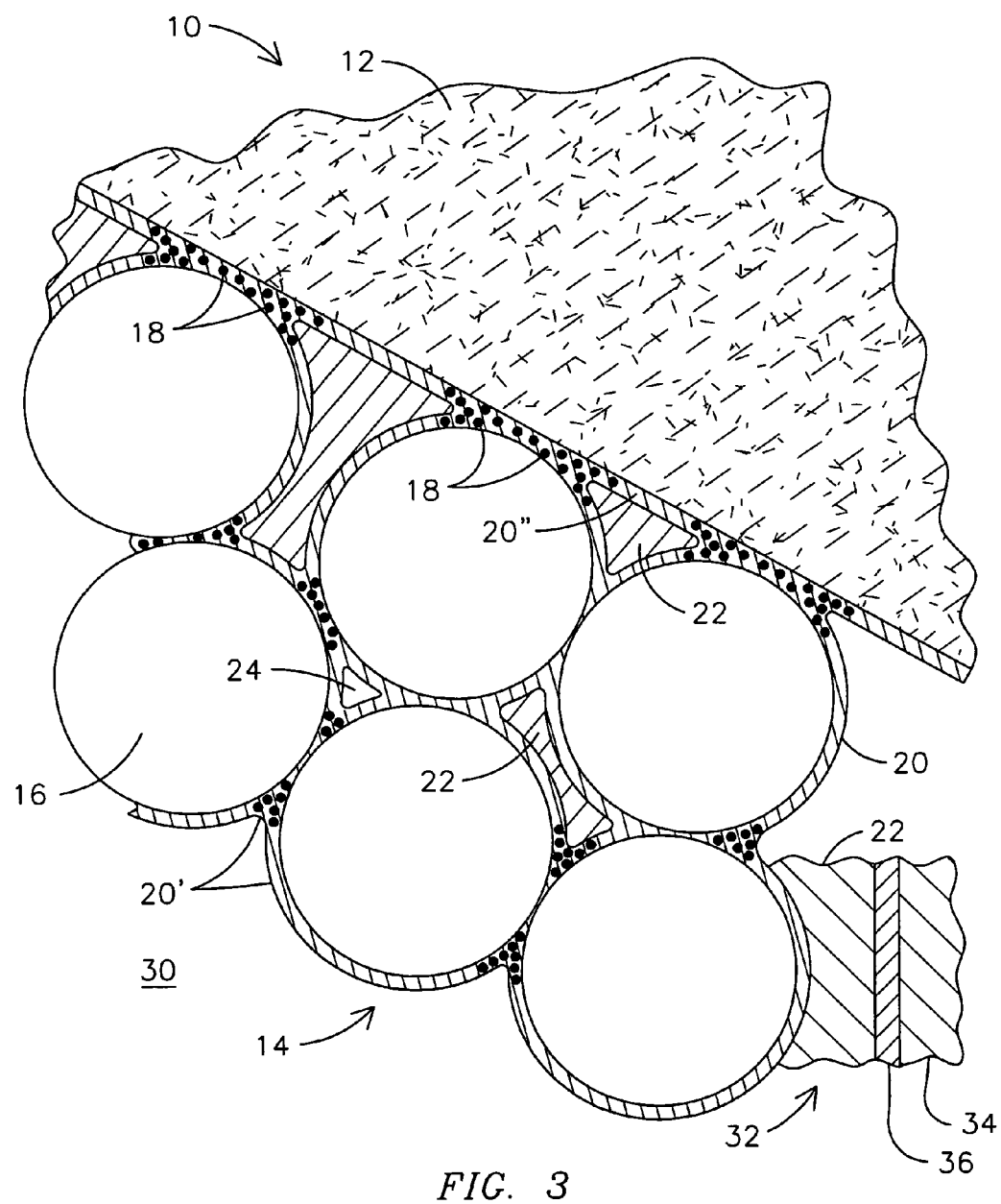
FIG. 3 is the material of FIG. 2 after further matrix densification steps.

The process for forming the improved CMC material 10 of the exemplary embodiment is illustrated schematically in FIGS. 1-3, where the CMC material 10 includes ceramic fibers 12 disposed in a ceramic matrix 14. The matrix 14 of the exemplary embodiment includes a plurality of non-sinterable oxide shapes 16 that provide a degree of dimensional stability to the material 10. The non-sinterable oxide shapes 16, which in the exemplary embodiment are dimensionally stable mullite spheres, are interconnected by a sinterable binder material of alumina particles 18 to define the porous matrix 14. Together, the non-sinterable mullite particles 16 and binding alumina particles 18 may be considered a first matrix phase 19. The term matrix phase as used herein is meant to include a single type of particles only, or a variety of particle types, or an infused layer of material only, or both particles and infused material together. FIG. 1 represents the inventive material 10 at a bisque fired stage of manufacture that is known in the art.

FIG. 2 illustrates the material of FIG. 1 after it has been further processed to infuse a diffusion barrier material 20 into the porous matrix material 14. The diffusion barrier material 20 may coat both the first matrix phase 19, as illustrated at 20' and the exposed surfaces of the fiber as illustrated at 20". The diffusion barrier material 20 may be infused into the matrix 14 as a precursor material that is subsequently heated to form the diffusion barrier material by processes known in the art.

FIG. 3 illustrates the material of FIG. 2 after it has been further processed through one or more matrix densification steps to deposit a second phase of matrix material 22 to at least partially fill voids in the matrix 14. The material is then final fired to achieve the improved mechanical properties cited above. The second phase of alumina matrix material may be introduced as aluminum hydroxychloride and then bisque fired to form alumina through one or more cycles as is known in the art to achieve a desired degree of porosity in the matrix 14. Some voids 24 will remain in the matrix 14, and in various trials the exemplary embodiment the improved material 10 exhibited a density in the range of 2.89-2.90 g/cc and an open porosity in the range of 18.75-19.65%. This compares to control samples of prior art A/N720-1 material exhibiting a density in the range of 2.86-2.87 g/cc and an open porosity in the range of 19.92-20.06%. Importantly, the diffusion barrier resides between the two matrix phases 19, 22, thereby preventing them from bonding together during sintering. Keeping the two matrix phases from sintering together allows for increased matrix density without increased sintering activity between the two matrix phases. In a secondary role, the diffusion barrier 20 also resides between the fibers 12 and the second matrix phase 22 and also prevents them from sintering together.

The diffusion layer compositions may include compositions that form weak debond layers such as traditionally used as fiber/matrix interface coatings; for example monazites, xenotimes, germinates, tungstates, vanadates, zirconia, hafnates, or other material having compatible chemistries and activation energy levels to function effectively as a diffusion barrier for the matrix material. Not only does the present invention provide higher interlaminar strength without a correspondingly high reduction in strain tolerance, notch insensitivity and strength in other material directions, but it also provides a material with higher thermal conductivity, thereby lowering stresses within the material resulting from thermal transients. A further advantage of the diffusion barrier between matrix phases is the prevention of matrix grain growth and continued densification during service. It is known that continued sintering of the alumina particles during service will result in eventual loss of composite ductility and strength. The diffusion barrier of the present invention coats the exposed particle surfaces, thereby preventing sintering associated with surface diffusion.

While various embodiments of the present invention have been shown and described herein, it will be obvious that such embodiments are provided by way of example only. For example, the exemplary embodiment of the invention is described as an oxide/oxide CMC material; however other embodiments may include non-oxide/non-oxide or oxide/non-oxide materials. The invention may further be applied to both 2D and 3D laminates. It is believed that a doubling of interlaminar strength and a 25% increase in through-thickness thermal conductivity may be achievable with minimal loss of in-plane strain-to-failure for 2D laminate embodiments of this invention. Even greater improvements in performance may be achievable for 3D laminate embodiments of the invention. Such improvements are significant in applications requiring a tight radius in a constrained geometry, such as when the material 10 is used in a vane 30 of a gas turbine engine. Numerous variations, changes and substitutions may be made without departing from the invention herein. For example, more than two phases of matrix material may be used with corresponding diffusion barriers being disposed between the respective adjacent phases, as is illustrated schematically at region 32 of FIG. 3. The various matrix phases 19, 22, 34 may be the same material or different materials, and the various diffusion barriers 20, 36 may be the same material or different materials. Accordingly, it is intended that the invention be limited only by the spirit and scope of the appended claims.

The invention claimed is:

1. A ceramic matrix composite material comprising ceramic fibers disposed within a porous ceramic matrix, the porous ceramic matrix comprising a first sinterable bisque fired phase separated from a second sinterable phase by a diffusion barrier material infused into the first sinterable bisque fired phase, the diffusion barrier material being effective to prevent sintering between the first and second sinterable phases, the second sinterable phase being effective to densify the porous ceramic matrix.

2. The material of claim 1, wherein the diffusion barrier material is further disposed between one of the sinterable phases and the ceramic fibers.

3. The material of claim 1, wherein each of the first and second sinterable phases comprises alumina and the diffusion barrier material comprising a monazite.

4. The material of claim 1, wherein the diffusion barrier material comprises lanthanum phosphate.

5. The material of claim 1, wherein the ceramic matrix comprises a third sinterable phase separated from the second sinterable phase by a second diffusion barrier.

6. A gas turbine component comprising the material of claim 1.

7. The material of claim 1, further comprising:
the first sinterable phase comprises particles of mullite interconnected by an alumina binder; and
the diffusion barrier material comprises one of the group of monazites, xenotimes, germinates, tungstates, vanadates, zirconia and hafnates.

8. The material of claim 7 wherein the diffusion barrier material comprises a monazite.

9. A ceramic matrix composite material comprising:
a plurality of oxide fibers disposed in a porous oxide matrix, the porous oxide matrix further comprising:
a first oxide bisque fired phase in contact with the oxide fibers;
a layer of diffusion barrier material disposed over the first oxide bisque fired phase and over the oxide fibers, the diffusion barrier material being infused into the first oxide bisque fired phase; and
a second oxide phase effective to densify the porous oxide matrix;
wherein the layer of diffusion barrier material is effective to limit sintering between the first and second oxide phases.

10. The material of claim 9, wherein the first oxide phase comprises a porous matrix of dimensionally stable mullite particles, and binder particles comprising alumina, the second oxide phase comprises alumina, and the diffusion barrier material comprises one of the group of monazites, xenotimes, germinates, tungstates, vanadates, zirconia and hafnates.

11. The material of claim 9, wherein the diffusion barrier material comprises lanthanum phosphate.

12. The material of claim 9, further comprising a third oxide phase separated from the second oxide phase by a second layer of diffusion barrier.

13. A gas turbine component comprising the material of claim 9.

* * * * *